United States Patent
Yeung (10) Patent No.: US 9,066,124 B2
(45) Date of Patent: Jun. 23, 2015

(54) VIDEO/AUDIO SWITCHING IN A COMPUTING DEVICE

(75) Inventor: Sip Kim Yeung, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 13/478,472

(22) Filed: May 23, 2012

(65) Prior Publication Data

US 2013/0209065 A1 Aug. 15, 2013

(30) Foreign Application Priority Data

Feb. 13, 2012 (TW) ............................... 101104494 A (51) Int. Cl.
| | |
|---|---|
| *H04N 9/80* | (2006.01) |
| *H04N 5/93* | (2006.01) |
| *H04N 21/414* | (2011.01) |
| *H04N 21/442* | (2011.01) |
| *H04N 21/443* | (2011.01) |
| *G06F 9/48* | (2006.01) |
| *H04N 5/44* | (2011.01) |
| *H04N 21/6377* | (2011.01) |
| *H04N 21/462* | (2011.01) |

(52) U.S. Cl.
CPC ..... *H04N 21/41407* (2013.01); *H04N 21/4424* (2013.01); *H04N 21/443* (2013.01); *G06F 9/485* (2013.01); *H04N 5/44* (2013.01); *H04N 21/6377* (2013.01); *H04N 21/4622* (2013.01)

(58) Field of Classification Search
None
See application file for complete search history.

(56) References Cited

U.S. PATENT DOCUMENTS

| | | | |
|---|---|---|---|
| 2007/0199020 A1 | 8/2007 | Kim et al. | |
| 2012/0009930 A1* | 1/2012 | Brisebois et al. | 455/450 |
| 2013/0067050 A1* | 3/2013 | Kotteri et al. | 709/223 |

FOREIGN PATENT DOCUMENTS

| | | |
|---|---|---|
| CN | 1756324 A | 4/2006 |
| CN | 101583025 B | 5/2011 |
| EP | 1641252 A2 | 3/2006 |
| WO | 0193587 A2 | 12/2001 |
| WO | 02063457 A1 | 8/2002 |

OTHER PUBLICATIONS

European Search Report, EP12181371, Aug. 21, 2014, 6 pages.
Taiwan Office Action, Jan. 23, 2015, 8 pages.
Taiwan Search Report, Jan. 16, 2015, 1 page.

* cited by examiner

*Primary Examiner* — Heather Jones
(74) *Attorney, Agent, or Firm* — Edell, Shapiro & Finnan, LLC (57) ABSTRACT

Video/audio switching techniques for control of an application running on a computing device. In accordance with an example technique, video and associated audio signals provided from a source for playback at the computing device are processed. It is detected that the application has been placed into the background or a suspend state and the processing of the video signals is terminated without affecting processing of the audio signals.

20 Claims, 5 Drawing Sheets

VIDEO/AUDIO SWITCHING IN A COMPUTING DEVICE

TECHNICAL FIELD

The present disclosure relates generally to the control of video and audio signals during the execution of an application on a computing device.

BACKGROUND

Portable computing devices, such as mobile phones, tablet computers, laptops, personal digital assistants (PDAs), etc. are becoming increasingly popular. Such computing devices provide users with a relatively small and portable device that can run various applications/programs. A wide variety of applications exist, including entertainment applications, reference applications, productivity applications (e.g., spreadsheet programs, word processing programs, calculators), and so forth. These applications allow the portable computing devices to provide desired functionality to a wide range of users in a wide range of environments and situations.

Computing devices now frequently also include communication capabilities. For example, most computing devices now include one or more interfaces (e.g., a Wi-Fi interface, a 3rd generation (3G) mobile telecommunications interface, IEEE 802.11 interface, IEEE 802.16 (WiMAX) interface, Bluetooth interface, fixed line interface, Long Term Evolution (LTE) interface, etc.) that enable applications to access content from external sources. Such content may include different types of audio files and/or video/audio files (e.g., files containing both audio and video signals).

SUMMARY

Described herein are methodologies for control of an application executed at a computing device. The method comprises using the application to process video signals and associated audio signals provided from a source for playback at the computing device. The method further comprises detecting that the application has been placed into the background, terminating processing of the video signal, and continuing to process the audio signals even though the video signals are no longer processed.

Another embodiment is directed to a software plug-in that controls an application executed to process and playback video and associated audio signals received from a source. The plug-in is configured to detect that the application has been placed into the background, and terminate processing of the video signals without affecting processing and playback of the audio signals.

BRIEF DESCRIPTION OF THE DRAWINGS

Embodiments are described herein in conjunction with the accompanying drawings, in which.

DESCRIPTION OF EXAMPLE EMBODIMENTS

Figure 1:
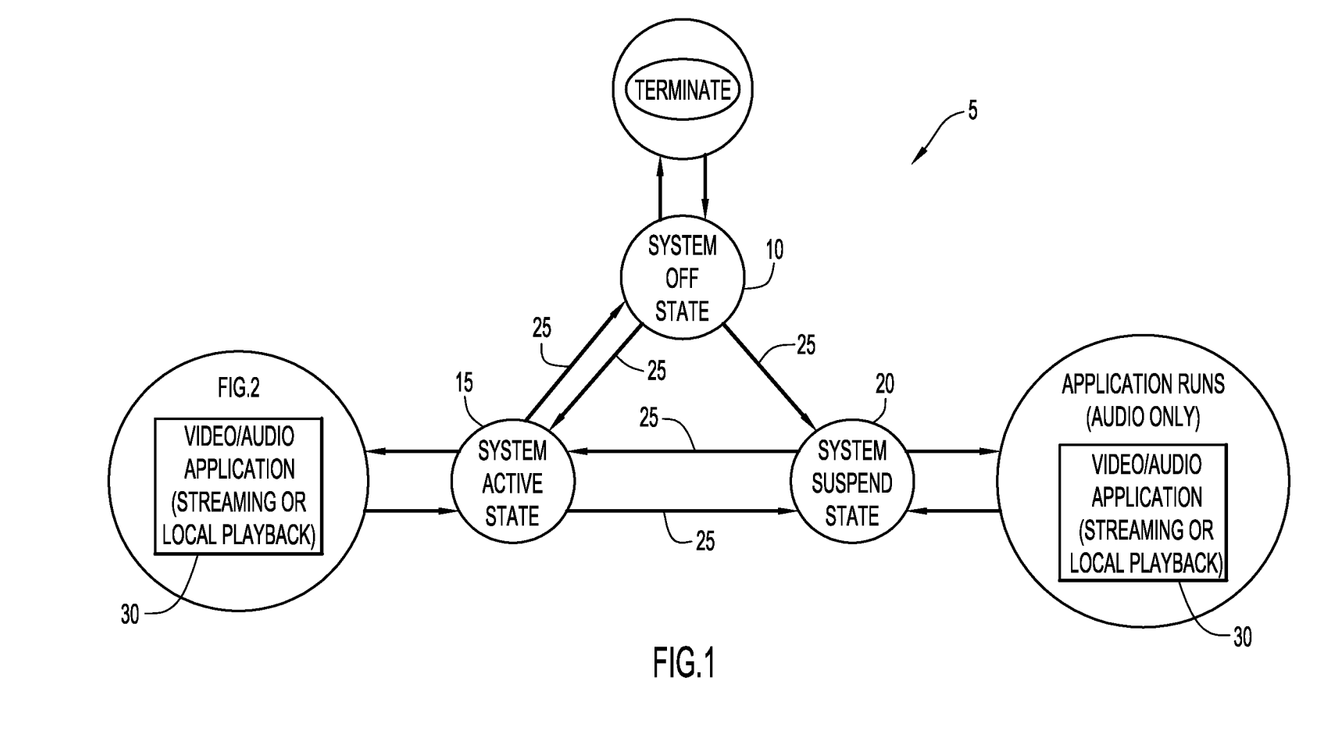
FIG. 1 is a flow diagram illustrating various states of a computing device and the execution of a combined video/audio application when the computing device is in a suspend state.

FIG. 1 is a flow diagram 5 illustrating various states of a computing device. In this example, the computing device includes a "system off" state 10, a "system active" state 15, and a "system suspend" state 20. In the system off or simply "off" state 10, the computing device is turned off and is non-operational. In the system active or simply "active" state 15, the device is operational and the computing device's display screen (e.g., liquid crystal display (LCD), etc.) is active (i.e., the display screen is not darkened or in a "sleep" mode). In the system suspend or simply "suspend" state 20, the computing device is operational (i.e., operating system of the computing device is running) but the computing device's display screen is de-activated (i.e., the screen is darkened, in a sleep mode, etc.).

In the active state 15, one or more applications may be in executed (i.e., run) on the computing device. As is well known in the art, there are a wide variety of applications that may be executed on a computing device that provide different types of functionality to a user. Certain applications are configured to enable users to view video signals provided to the computing device's display screen and, simultaneously, listen to audio signals associated with the video signals. These applications are sometimes referred to herein as combined video/audio or simply audio video applications because video/audio signals are processed and simultaneously played to the user. These or other applications may enable a user to listen to audio signals only (i.e., without video) and are sometimes referred to herein as audio only or simply audio applications.

In conventional arrangements, when an audio only application is running in the active state 15 and the computing device subsequently enters the suspend state 20, the audio only application will continue to run (i.e., the application continues to provide audio signals to the user at the audio output). However, in conventional arrangements, when a combined video/audio application is running in the active state 15 and the computing device subsequently enters suspend state 20, the video/audio application will cease operation entirely (i.e., neither audio nor video will be provided to the user).

Additionally, within active state 15, an application may be in the "foreground" or in the "background." An application is in the foreground when it is running and viewable at the display screen, while an application is in the background when it is running behind another application (i.e., is not visible at the display screen). In conventional arrangements, when an audio only application is running in the foreground and is subsequently placed into the background, the audio only application will continue to run (i.e., the application continues to provide audio signals to the user at the audio output). However, in conventional arrangements, when a combined video/audio application is running in the foreground and is subsequently placed into the background, the combined video/audio application will cease operation (i.e., neither audio nor video will be provided to the user).

As such, in conventional arrangements, audio only applications and combined video/audio applications will have different behavior in both active state 15 and in the suspend state 20. This difference in behavior between audio only applications and combined video/audio applications is a result of power limitations at the computing device. Specifically, the processing and display of video signals consumes significantly more power than the processing and playback of audio signals. As such, when a combined video/audio application is placed in the background (or when the computing device enters the suspend state) the device cannot afford to expend the necessary resources for processing and display of video signals when the video signals are not viewable by the user. Therefore, as detailed above, conventional arrangements terminate operation of the combined video/audio applications in order to save the desired power. Although termination of the video/audio applications saves power by stopping the processing/display of the video signals, such termination also stops the processing of the audio signals, even though audio processing does not give rise to the same power management problems.

The above difference in behavior between audio only applications and combined video/applications may negatively impact the user experience (i.e., how a person feels about using the device), which is an important factor in system design, particularly in consumer devices. Embodiments described herein are generally directed to new video/audio switching techniques in which the behavior of combined video/audio applications is substantially similar to the behavior of audio only applications in both the active state 15 and the suspend state 20.

As shown by the arrows 25 in FIG. 1, a computing device may switch between the off state 10, the active state 15, and the suspend state 20. A combined video/audio application 30, which, as described below may be streaming or local playback, is initially running (i.e., executed) while the computing device is in active state 15. The details of the operation of video/audio application 30 in active state 15 are described below with reference to FIG. 2. However, in one example, the computing device may switch to (i.e., enter) the suspend state 20. In accordance with the new video/audio switching techniques described herein, when the computing device enters the system suspend state, the video/audio application 30 continues to run. However, in this arrangement, the processing of the video signals is terminated, but the audio signals are still played. As such, when in the suspend state 20, a user may still be able to listen to the audio signals associated with video signals, even though the video signals are no longer processed and displayed at the computing device. This configuration in which audio is continued to be played while the video processing is terminated conserves power, but also improves user experience because, while in the suspend state 20, the video/audio applications and the audio applications now operate substantially the same (i.e., audio is still played to the user even though the device is in a suspended state).

Figure 2:
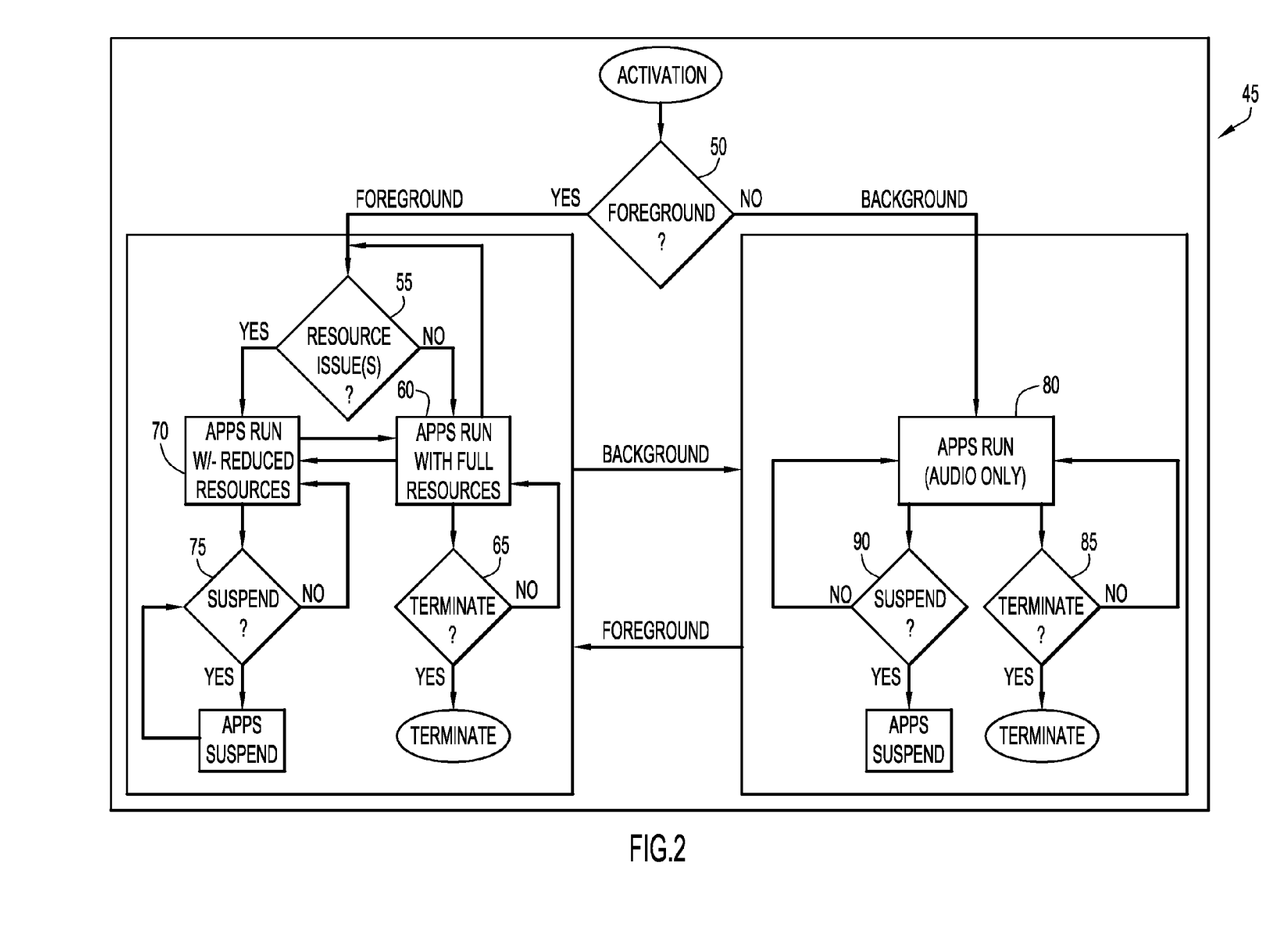
FIG. 2 is a flowchart illustrating the execution of the combined video/audio application when the computing device is in an active state.

FIG. 2 is a flow chart illustrating a method 45 of execution of video/audio application 30 when the computing device is in active state 15. When video/audio application 30 is the active state 15, at 50 a determination is made as to whether the application is running in the foreground or the background. If the video/audio application 30 is in the foreground, the method proceeds to 55 where a determination is made as whether there are resource issue(s) (i.e., when limited memory is available, central processing unit (CPU) usage is too high, etc.). If there are no resources issues, the method 45 proceeds to 60 where the video/audio application 30 will run with full resources. The method 45 may continue to check to ensure that there are no resource issues (i.e., method 45 may loop between 55 and 60). Similarly, a check will be periodically performed, at 65, to determine if the video/audio application 30 should be terminated. The video/audio application 30 will continue to run with full resources at 60 until the application is terminated at 65, a resources issue is identified at 55, or the application is placed into the background. Method 45 may periodically loop pack to 50 to make the foreground/background determination.

Returning to 55, if there are one or more resources issues, method 45 proceeds to 70 where the video/audio application 30 runs with reduced resources. The method 45 may continue to check to determine if the resource issues are ongoing (i.e., method 45 may loop between 55 and 70). If the resource issues are resolved, the video/audio application 30 may begin operating with full resources, as described above.

A check will be periodically performed, at 75, to determine if the video/audio application 30 should be suspended due to, for example, additional resource issues. The video/audio application 30 will continue to run with limited resources at 70 until the application is suspended at 75 or the resources issues are resolved, as determined at 55, at which time the application may operate with full resources.

Returning to 50, if it is determined that the application is not in the foreground (i.e., it is in the background), method 45 proceeds to 80 where video/audio application 30 runs, but only audio signals from a source are processed and played. That is, the application continues to run but the video signals from the source are no longer processed and thus no longer displayed at the display screen. As such, the user can still listen to the audio signals associated with the video signals, but power is conserved by terminating processing/display of the video signals.

While video/audio application 30 is in the background, a check will be periodically performed, at 85, to determine if the video/audio application 30 should be terminated. Similarly, a check will be periodically performed, at 90, to determine if the video/audio application 30 should be suspended due to, for example, resource issues. The video/audio application 30 will continue to run with the audio only at 80 until the application is terminated at 85, the application is suspended at 90, or the application is placed into the foreground. Method 45 may periodically loop pack to 50 to make the foreground/background determination.

The flowchart of FIG. 2 is merely one example of operations that may be performed while video/audio application 30 is operating in the active state 15. The specific illustrated operations of FIG. 2 are merely used to provide context for the concept that, when the video/audio application 30 is placed into the background, the audio processing and playback continues while the video processing and display is terminated until the application is brought back into the foreground.

Figure 3:
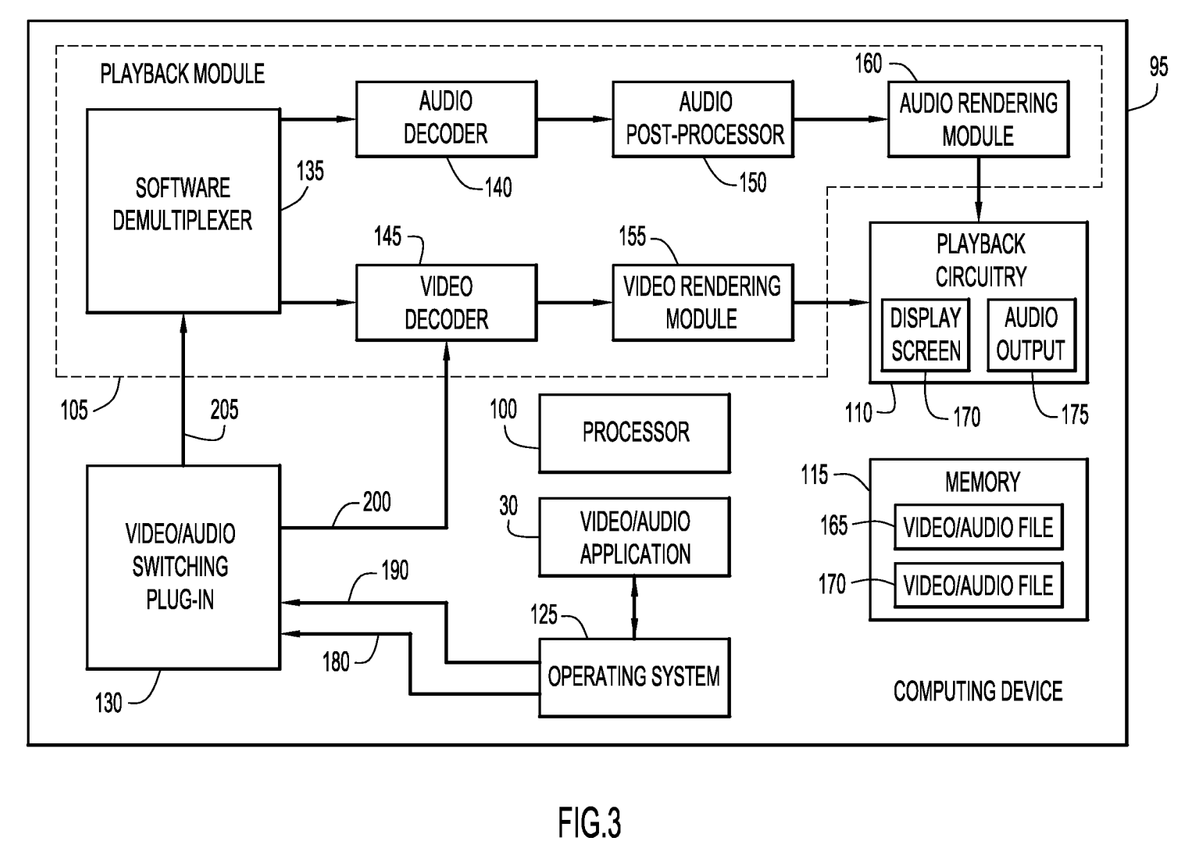
FIG. 3 is a block diagram of a computing device configured to implement an example video/audio switching technique.

FIG. 3 is a schematic block diagram of a computing device 95 configured to implement example video/audio switching techniques described herein. Computing device 95 may be, for example, a mobile phone, tablet computer, laptop, personal digital assistant (PDA), etc.

As shown, computing device 95 comprises a processor 100, a playback module 105, playback circuitry 110, a memory 115, a video/audio application 30 (as described above), an operating system 125, and a video/audio switching plug-in 130. Playback module 105 comprises a software demultiplexer 135, an audio decoder 140, a video decoder 145, an audio post-processor 150, a video rendering module 155, and an audio rendering module 160.

Merely for purposes of illustration, video/audio application 30, operating system 125, and video/audio switching plug-in 130 are shown in FIG. 3 as separate functional blocks. It should be appreciated that these and/or elements, such as elements of playback module 105 (e.g., software demultiplexer 135), may all be software components that are executable from memory 115. As such, FIG. 3 provides a schematic illustration of the example computing device 95 and does not necessarily illustrate how such a computing device may be implemented in practice.

It is to be appreciated that memory 115 may comprise read only memory (ROM), random access memory (RAM), magnetic disk storage media devices, optical storage media devices, flash memory devices, electrical, optical, or other physical/tangible memory storage devices. The processor 100 is, for example, a microprocessor or microcontroller that executes instructions for the various functional blocks (e.g., video/audio application 30, operating system 125, and video/audio switching plug-in 130, software demultiplexer 135, etc.). Thus, in general, the memory 115 may comprise one or more non-transitory tangible computer readable storage media (e.g., a memory device) encoded with software comprising computer executable instructions and when the software is executed (by the processor 100) it is operable to perform the operations described herein in connection with the various functional blocks.

When computing device 95 is in the active state 15 (FIG. 1), processor 100 is configured to execute (run) video/audio application 30. Execution of video/audio application 30 causes the delivery of a packaged video/audio file to software demultiplexer 135. The packaged video/audio file may be in, for example, an H.264/MPEG-4 Part 10 or Advanced Video Coding (AVC) format, that includes both formatted video and audio signals. The video signals may be, for example, in an MEPG-4 format, while the audio signals may be, for example, in an MPEG-1 or MPEG-2 Audio Layer III (MP3) format, Advanced Audio Coding (AAC) format, etc. The packaged video/audio file includes both encoded video signals and encoded audio signals associated with the video, and the format in which the video/audio file is received by software demultiplexer 135 is not relevant to the video/audio switching techniques described herein.

The video/audio file may be delivered to the software demultiplexer 135 from a local source (e.g., local playback) or from an external source, such as a web server supporting a particular website, (e.g., streaming playback). FIG. 3 illustrates an example of local playback in which the video/audio application 30 is configured to deliver a video/audio file 165 stored in memory 115 to software demultiplexer 115. As shown in FIG. 3, one or more other files, such as video/audio file 170, may also be stored in memory 115.

When software demultiplexer 135 receives packaged video/audio file 170, the demultiplexer is configured to separate the video signals and associated audio signals. The audio signals are then provided to audio decoder 140 while the video signals are provided to video decoder 145 that each performs respective decoding operations. The decoded audio signals are then provided to audio post-processor 150. After performance of the post-processing operations, the audio signals are provided to audio rendering module 160. Similarly, the decoded video signals are provided to video rendering module 155. The operations of audio decoder 140, audio post-processor 150, audio rendering module 160, for processing audio signals, and the operations of video decoder 145 and video rendering module 155 for processing video signals are known in the art and will not be described in detail herein.

The video rendering module 155 and audio rendering module 160 are configured to deliver processed video and audio signals, respectively, to playback circuitry 110. Playback circuitry 110 comprises various hardware components that, when supported by software components stored in memory 115, are configured to display the processed video signals at display screen 170, and play the processed audio signals at audio output 175. Display screen 170 may comprise, for example, a liquid crystal display (LCD) display. In certain examples, the LCD display may be proximate to, or integrated with, a touch panel. Audio output 175 may comprise, for example, a speaker, an audio port, etc. The operations of playback circuitry 110 for playing processed video and audio signals are known in the art and will not be described in detail herein.

As noted above, video/audio application 30 has specific behavior depending on the state of computing device 95, and depending on whether the application is running in the foreground or the background. This specific behavior may be enabled through execution of video/audio switching plug-in 130. In computing, a plug-in or plugin is a set of software components that adds specific functionality to a different software application. In the example of FIG. 3, video/audio switching plug-in 130 adds functionality to video/audio application 30 so that it behaves as described above with reference to FIGS. 1 and 2 (e.g., plays only audio signals when computing device 95 is in the suspend state or when video/audio application 30 is in the background).

In the example of FIG. 3, operating system 125 is configured to detect the current state (e.g., active or suspend) of computing device 95. Operating system 125 is configured to provide a notification 190 to video/audio switching plug-in 130 that indicates the current state of computing device 95. Similarly, if video/audio application 30 is currently running so as to playback video and audio, video/audio application 30 is configured to carry its own state (i.e., foreground or background) that is made available to video/audio switching plug-in 130 via a notification 180 from the operating system 125. In an alternative arrangements operating system 125, is configured to detect if the video/audio application 30 is running in the foreground or the background. When video/audio application 30 is currently running so as to playback video and audio, video/audio switching plug-in 130 monitors the notifications from operating system 125 to adjust the behavior of the application.

Video/audio switching plug-in 130 may be pre-installed or downloaded to computing device 95. The computing device 95 may also include a set-up control via which the functionality of video/audio switching plug-in 130 may be enabled/disabled.

It is to be appreciated that the notifications 180 and 190 to video/audio switching plug-in 130 may be express notifications or implicit notifications. As used herein, an express notification refers to the transmission of a signal that indicates the result of a certain operation (e.g., a signal indicating that the video/audio application 30 is or is not in the background or foreground). An implicit notification is the lack of the receipt of a signal, interpreted by video/audio switching plug-in 130 to mean a certain result.

In the example of FIG. 3, when video/audio switching plug-in 130 receives a notification indicating that video/audio application 30 is in the background, or indicating that computing device 95 has entered the suspend state, video/audio switching plug-in 130 is configured to disable the processing of the video signals by playback module 105. However, playback module 105 is configured to continue processing and playing the audio signals. That is, video/audio switching plug-in 130 causes the operation of the video/audio application 30 to be substantially the same as a pure audio application when the computing device 95 enters the suspend state, or when the applications are placed into the background.

Furthermore, video/audio application 30 and/or operating system 125 is configured to detect when computing device 95 re-enters the active state from the suspend state or when video/audio application 30 switches from the background back to the foreground, and provide a resulting notification to video/audio switching plug-in 130. In response to a notification indicating that computing device 95 has re-entered the active state from the suspend state, or a notification indicating that video/audio application 30 has switched from the background to the foreground, the video/audio switching plug-in 130 is configured to re-enable the processing of the video signals so that the video and audio signals are simultaneously played.

There are several different ways for the video/audio switching plug-in 130 to disable/re-enable the processing of the video signals. In one embodiment, video/audio switching plug-in 130 is configured to transmit an enable/disable signal, represented by arrow 200, to video decoder 145 that causes video decoder to terminate/re-start processing (i.e., decoding) of the video signals from software demultiplexer 135. In another embodiment, the video/audio switching plug-in 130 is configured to transmit an enable/disable signal, represented by arrow 205, to software demultiplexer 135. When used to disable video processing, the signal 205 causes software demultiplexer 135 to drop all, or a portion of the video signals, so that the video decoding operations at video decoder 145 are eliminated or substantially reduced. In other words, the demultiplexer is configured to take away the video components so that the video decoder 145 has little to process. When used to re-enable video processing, the signal 205 causes software demultiplexer to restart providing of the video signals to the video decoder 145.

The notifications 200 or 205 may, in certain examples, may be sent to the software demultiplexer 135 or video decoder via operating system 125. Additionally, the notifications 200 or 205 may, in certain examples, be implemented as software hooks. A software hook is a segment of code that intercepts signals (e.g., function calls, messages, events, etc.) passed between components. The software hook then manipulates the intercepted signals for its own use. In the example of FIG. 3, the manipulated use of the intercepted signals is to function as the enable/disable notifications.

As noted above, in response to notifications 200 or 205, the processing of the video signals may be terminated at different locations. However, in these examples, the synchronization data between the video and audio signals is maintained so that playback of the video signals may start again in the correct place (i.e., so that the audio and video signals remain aligned).

Figure 4:
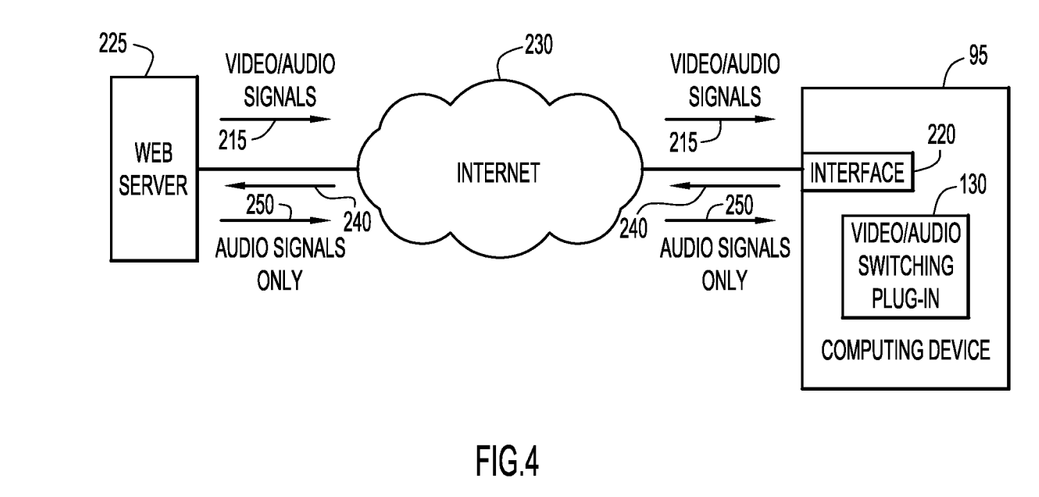
FIG. 4 is a block diagram of a computing device configured to implement an example video/audio switching technique when video/audio signals are received from an external source.

FIG. 3 illustrates two different ways for video/audio switching plug-in 130 to enable/disable processing of video signals. FIG. 4 is a block diagram illustrating another mechanism for enabling/disabling the video processing. In FIG. 4, computing device 95 is implemented substantially the same as described above with reference to FIG. 3. However, merely for ease of illustration, only video/audio switching plug-in 130 and an interface 220 are shown in FIG. 4.

In the example of FIG. 4, computing device 95 is configured to receive video/audio signals from an external source. More specifically, FIG. 4 illustrates a streaming playback example in which video/audio signals 215 are streamed to computing device 95 from a web server 225. Computing device 95 includes an Internet enabled interface 220 (e.g., Wi-Fi, 3G, IEEE 802.11, IEEE 802.16 (WiMAX), etc.,) that enables communication with web server 225 via the Internet 230.

In the example of FIG. 4, computing device 95 is in the active state and video/audio application 30 is operating in the foreground. Subsequently, video/audio switching plug-in 130 detects that computing device 95 has entered the suspend state, or that video/audio application 30 has switched to the background. In order to terminate processing of the video signals (while continuing to process the audio signals), video/audio switching plug-in 130 is configured to transmit at least one signal 240 to web server 225. The signal 240 causes web server 225 to cease transmission of video signals to computing device 95. As such, after receipt of signal 240, web server 225 transmits only audio signals 250 to computing device 95. The transmission of only audio signals 250 reduces the bandwidth utilized for the stream and conserves power since no video signals are present for processing at computing device 95. Similar to the examples of FIG. 3, video/audio synchronization information may still be sent with the audio signals 250. Upon detection that computing device 95 has re-entered the active state, or that video/audio application 30 has switched to the foreground, video/audio switching plug-in 130 will re-transmit at least one signal (e.g., another signal 240) to web server 225 so that streaming of video signals can be restarted.

Figure 5:
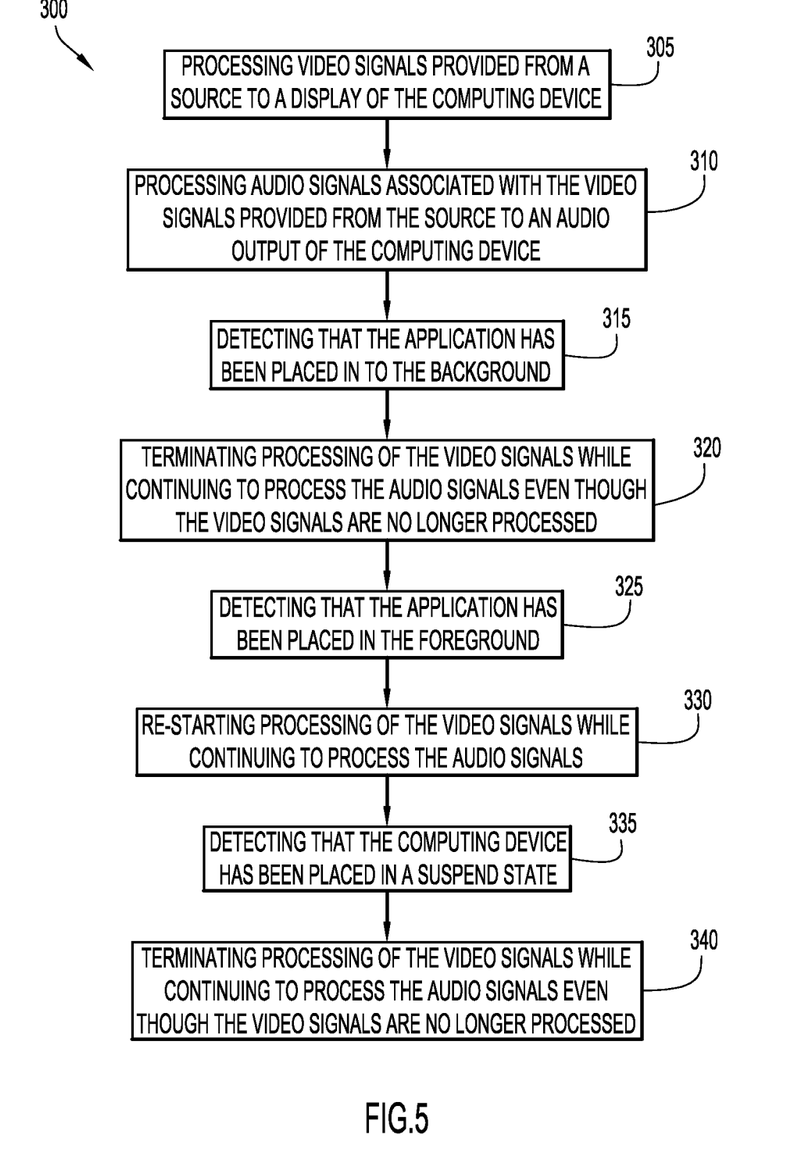
FIG. 5 is a flowchart of an example method implemented in accordance with video/audio switching techniques.

FIG. 5 is a high-level of a flowchart of a method 300 implemented in accordance with example video/audio switching techniques. In this example, at 305, video signals provided from a source to a display of the computing device are initially processed by the computing device. At 310, audio signals associated with the video signals, which are provided from the source to an audio output of the computing device, are also processed by the computing device. As noted above, the source of the video/audio signals may be a local source (e.g., a file stored in memory) or an external source (e.g., a web server). At 315, it is detected that the running application has been placed into the background. At 320, the processing of video signals is terminated while the processing of the audio signals continues (even though the video signals are no longer processed). As described above, a number of different mechanisms may be employed to terminate processing of the video signals.

At 325, it is detected that the application has returned to the foreground. As such, the processing of the video signals is re-started at 330. Subsequently, at 335, it is detected that the computing device has been placed in a suspend state. Therefore, at 340, the processing of video signals is terminated while the processing of the audio signals continues.

The above description is intended by way of example only.

What is claimed is:

1. A method for control of a combined video/audio application executed at a computing device, comprising:

receiving, at a demultiplexer of a playback module of the computing device, a packaged combined video/audio file from a source, wherein the packaged combined video/audio file comprises audio signals that are associated with video signals;

separating, with the demultiplexer, the audio signals from the video signals;

processing the video signals separated from the audio signals for display at a display screen of the computing device;

processing the audio signals separated from the video signals for playback at an audio output of the computing device;

detecting, with a video/audio switching plug-in associated with the video/audio application, that the computing device has been placed in a suspend state where the display screen of the computing device is de-activated;

transmitting a disable signal from the video/audio switching plug-in to the demultiplexer to cause the demultiplexer to cease output of video signals; and continuing to process the audio signals at the demultiplexer even though the video signals are no longer processed by the demultiplexer.

2. The method of claim 1, further comprising:
   detecting that the computing device has been placed in an active state where a display screen of the computing device is activated;
   transmitting an enable signal from the video/audio switching plug-in to the demultiplexer to cause the demultiplexer to restart output of the video signals; and
   continuing to process the audio signals.

3. The method of claim 2, further comprising:
   detecting that a combined video/audio application associated with the playback of the packaged combined video/audio file has been placed into the background;
   transmitting a disable signal from the video/audio switching plug-in to the demultiplexer to cause the demultiplexer to cease output of video signals; and
   continuing to process the audio signals at the demultiplexer even though the video signals are no longer processed by the demultiplexer.

4. The method of claim 3, further comprising:
   determining that the combined video/audio application has been placed into the foreground;
   transmitting an enable signal from the video/audio switching plug-in to the demultiplexer to cause the demultiplexer to restart output processing of the video signals; and
   continuing to process the audio signals.

5. The method of claim 1, wherein the packaged combined video/audio file is received from a source external to the computing device.

6. One or more non-transitory computer readable storage media encoded with software comprising computer executable instructions operable to:
   receive, at a demultiplexer of a playback module of the computing device, a packaged combined video/audio file from a source, wherein the packaged combined video/audio file comprises audio signals that are associated with video signals;
   separate, with the demultiplexer, the audio signals from the video signals for processing and playback;
   detect that the computing device has been placed in a suspend state where a display screen of the computing device is de-activated; and
   initiate the transmission of a disable signal to one or more elements of the playback module to cause the playback module to terminate processing of the video signals without affecting processing and playback of the audio signals.

7. The non-transitory computer readable storage media of claim 6, further operable to:
   detect that the computing device has been placed in an active state where a display screen of the computing device is activated; and
   initiate the transmission of an enable signal to the playback module to re-start processing of the video signals by the playback module.

8. The non-transitory computer readable storage media of claim 7, further operable to:
   detect that a combined video/audio application associated with the playback of the packaged combined video/audio file has been placed into the background; and
   initiate the transmission of a disable signal to one or more elements of the playback module to cause the playback module to terminate processing of the video signals without affecting processing and playback of the audio signals.

9. The non-transitory computer readable storage media of claim 8, further operable to:
   determine that the combined video/audio application has been placed into the foreground; and
   initiate the transmission of an enable signal to the playback module to re-start processing of the video signals by the playback module.

10. The non-transitory computer readable storage media of claim 6, wherein the video signals are processed by a video decoder, and wherein to terminate the processing of the video signals the software is operable to:
    initiate the transmission of a disable signal to the video decoder to terminate processing of the video signals at the video decoder.

11. The non-transitory computer readable storage media of claim 6, wherein to terminate the processing of the video signals the software is operable to:
    initiate the transmission of a disable signal to the demultiplexer to cease output of the video signals from the demultiplexer.

12. The non-transitory computer readable storage media of claim 6, wherein the packaged combined video/audio file is received from a source external to the computing device, and wherein to terminate the processing of the video signals the software is operable to:
    cause a signal to be transmitted to the external source to stop transmission of the video signals.

13. The non-transitory computer readable storage media of claim 12, further operable to:
    detect that a combined video/audio application associated with the playback of the packaged combined video/audio file has been placed into the foreground; and
    cause a signal to be transmitted to the external source to re-start transmission of the video signals.

14. A method for control of a combined video/audio application executed at a computing device, comprising:
    receiving, at a demultiplexer of a playback module of the computing device, a packaged combined video/audio file from a source, wherein the packaged combined video/audio file comprises audio signals that are associated with video signals;
    separating, with the demultiplexer, the audio signals from the video signals;
    processing the video signals separated from the audio signals for display at a display screen of the computing device;
    processing the audio signals separated from the video signals for playback at an audio output of the computing device;
    detecting, with a video/audio switching plug-in associated with the video/audio application, that the computing device has been placed in a suspend state where the display screen of the computing device is de-activated; and
    transmitting a disable signal from the video/audio switching plug-in to one or more elements of the playback module to cause the playback module to terminate processing of the video signals without affecting processing and playback of the audio signals.

15. The method of claim 14, further comprising:
    detecting that the computing device has been placed in an active state where the display screen of the computing device is activated; and transmitting an enable signal from the video/audio switching plug-in to one or more elements of the playback module to re-start processing of the video signals by the playback module.

16. The method of claim 15, further comprising:
detecting that a combined video/audio application associated with the playback of the packaged combined video/audio file has been placed into the background; and
transmitting a disable signal to one or more elements of the playback module to cause the playback module to terminate processing of the video signals without affecting processing and playback of the audio signals.

17. The method of claim 16, further comprising:
determine that the combined video/audio application has been placed into the foreground; and
transmitting an enable signal from the video/audio switching plug-in to one or more elements of the playback module to re-start processing of the video signals by the playback module.

18. The method of claim 14, wherein the video signals are processed by a video decoder of the playback module, and wherein to terminate the processing of the video signals the method further comprises:
transmitting a disable signal from the video/audio switching plug-in to the video decoder to terminate processing of the video signals at the video decoder.

19. The method of claim 14, wherein to terminate the processing of the video signals the method further comprises:
transmitting a disable signal from the video/audio switching plug-in to the demultiplexer to cease output of the video signals from the demultiplexer.

20. The method of claim 14, wherein the packaged combined video/audio file is received from a source external to the computing device, and wherein to terminate the processing of the video signals the method further comprises:
transmitting a signal to the external source to stop transmission of the video signals.

* * * * *